(12) United States Patent
Lin

(10) Patent No.: US 9,518,600 B2
(45) Date of Patent: Dec. 13, 2016

(54) SAFETY HOOK

(71) Applicant: USANG INDUSTRIAL CO., LTD., Taipei (TW)

(72) Inventor: Yu-Wen Lin, Taipei (TW)

(73) Assignee: USANG INDUSTRIAL CO., LTD., Taipei (TW)

( * ) Notice: Subject to any disclaimer, the term of this patent is extended or adjusted under 35 U.S.C. 154(b) by 138 days.

(21) Appl. No.: 14/307,061

(22) Filed: Jun. 17, 2014

(65) Prior Publication Data
US 2014/0373319 A1  Dec. 25, 2014

(30) Foreign Application Priority Data

Jun. 20, 2013 (TW) .............................. 102211561 U

(51) Int. Cl.
*F16B 45/02* (2006.01)

(52) U.S. Cl.
CPC ............ *F16B 45/02* (2013.01); *Y10T 24/4533* (2015.01); *Y10T 24/4534* (2015.01); *Y10T 24/45366* (2015.01)

(58) Field of Classification Search
CPC ............. Y10T 24/4534; Y10T 24/4533; Y10T 24/45366; F16B 45/02
See application file for complete search history.

(56) References Cited

U.S. PATENT DOCUMENTS

| | | | | |
|---|---|---|---|---|
| 8,117,721 B2* | 2/2012 | Yang | ........................ | F16B 45/02 24/599.5 |
| 2011/0113603 A1* | 5/2011 | Yang | ........................ | F16B 45/02 24/599.6 |
| 2011/0126386 A1* | 6/2011 | Liang | ...................... | F16B 45/02 24/599.5 |
| 2012/0102688 A1* | 5/2012 | Yang | ........................ | F16B 45/02 24/600.1 |
| 2013/0025095 A1* | 1/2013 | Yang | ........................ | F16B 45/02 24/599.5 |
| 2013/0219673 A1* | 8/2013 | Perner | ...................... | F16B 45/02 24/375 |
| 2015/0231423 A1* | 8/2015 | Perner | ................ | A62B 35/0075 24/505 |

\* cited by examiner

*Primary Examiner* — Robert J Sandy
*Assistant Examiner* — Michael Lee
(74) *Attorney, Agent, or Firm* — Hamre, Schumann, Mueller & Larson, P.C.

(57) ABSTRACT

A safety hook includes a hook body and a trigger unit. The hook body has an opening. The trigger unit includes a keeper member and a trigger member. The keeper member is connected to the hook body. The trigger member is connected to the keeper member. The keeper member is operable to pivot relative to the hook body. The trigger member engages the hook body, and is unable to pivot relative to the keeper member so as to block the opening of the hook body when the keeper member is at a released position. The trigger member is moved via the keeper member to be disengaged from the hook body, and is able to pivot to unblock the opening of the hook body when the keeper member is at a pressed position.

14 Claims, 14 Drawing Sheets

SAFETY HOOK

CROSS-REFERENCE TO RELATED APPLICATION

This application claims priority of Taiwanese Application No. 102211561, filed on Jun. 20, 2013.

BACKGROUND OF THE INVENTION

1. Field of the Invention

The invention relates to a safety hook, more particularly to a highly-safe safety hook.

2. Description of the Related Art

A conventional safety hook includes a hook body that has an opening, and a trigger member that releasably blocks the opening of the hook body. The conventional safety hook may be tied on an aerial worker with the hook body hooking a guide rail or a guide rope and the opening being blocked by the trigger member, such that the aerial worker may move safely along the guide rail or the guide rope.

However, the trigger member may be easily driven to unblock the opening of the hook body through an accidental impact or depression, and the hook body may therefore be easily detached from the guide rail or the guide rope, thus endangering the worker.

SUMMARY OF THE INVENTION

Therefore, the object of the present invention is to provide a safety hook that can overcome the aforesaid drawbacks associated with the prior arts.

Accordingly, a safety hook of the present invention includes a hook body and a trigger unit. The hook body has a base segment, a hook segment that extends curvedly from the base segment, and an auxiliary hook segment that extends from a distal end of the hook segment. The auxiliary hook segment and the base segment cooperatively define an opening therebetween. The trigger unit includes a keeper member and a trigger member. The keeper member is connected pivotally to the base segment of the hook body. The trigger member is connected pivotally to the keeper member. The keeper member is operable to pivot relative to the base segment between a released position and a pressed position, so as to drive the trigger member to move relative to the hook body. The trigger member engages the base segment and the auxiliary hook segment of the hook body, and is unable to pivot relative to the keeper member so as to block the opening of the hook body when the keeper member is at the released position. The trigger member is disengaged from the base segment and the auxiliary hook segment of the hook body, and is able to pivot relative to the keeper member to unblock the opening of the hook body when the keeper member is at the pressed position.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
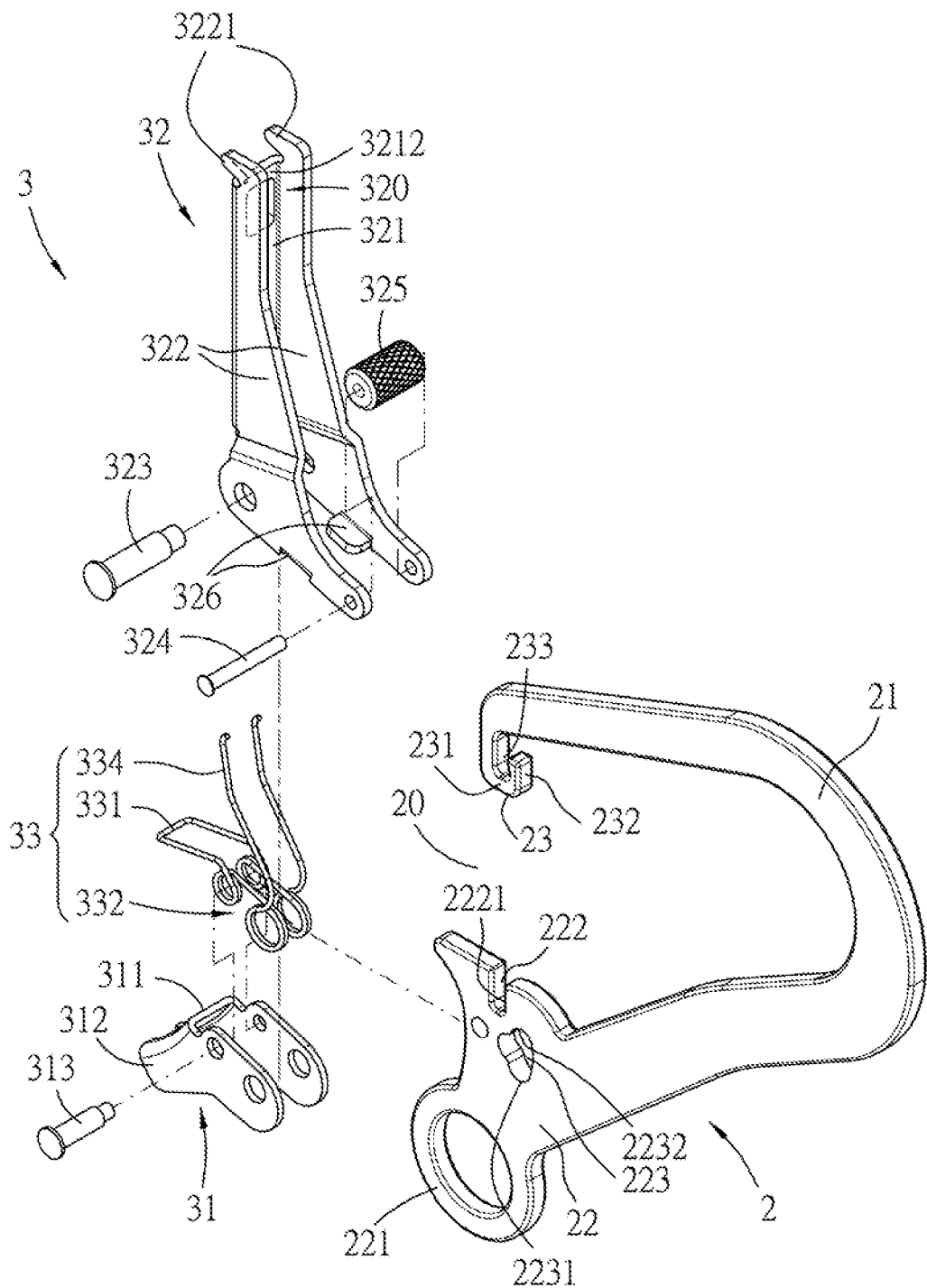
FIG. 1 is an exploded perspective view of a first preferred embodiment of a safety hook according to the invention.
Figure 2:
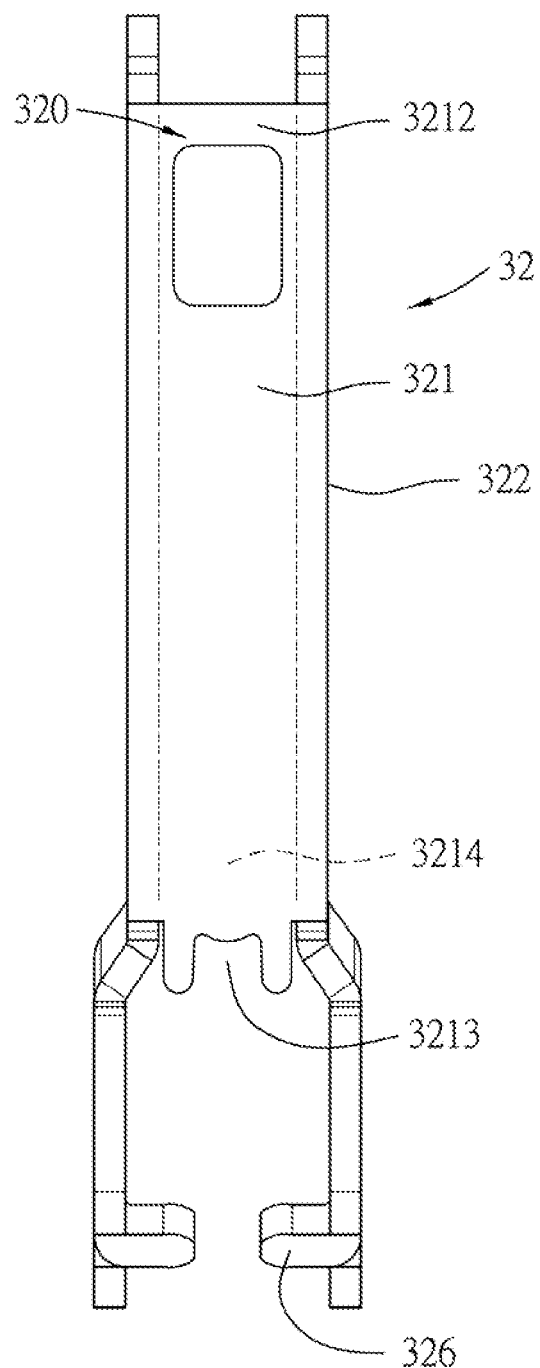
FIG. 2 is a side view of a trigger member of the first preferred embodiment.
Figure 3:
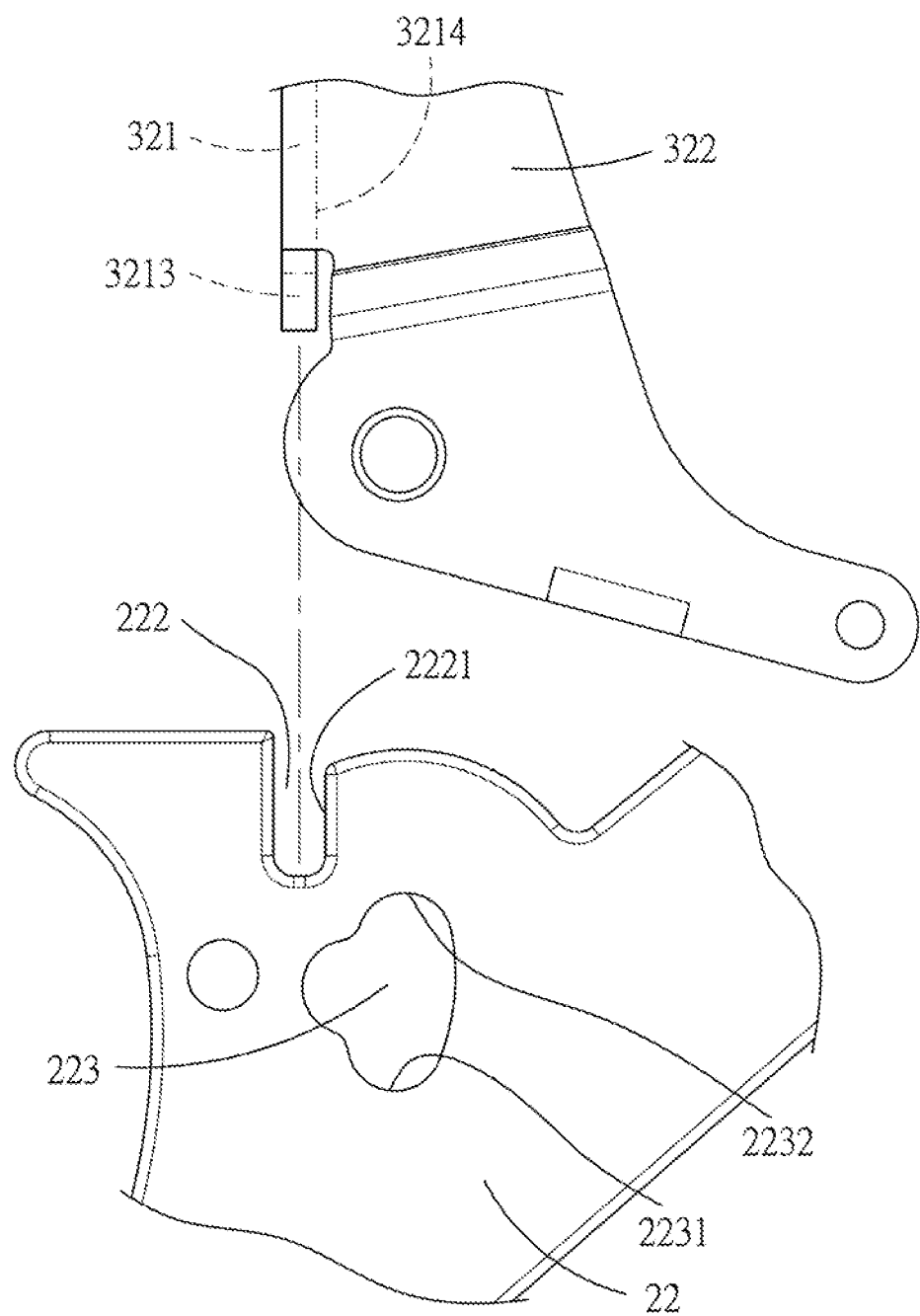
FIG. 3 is a fragmentary exploded side view of the first preferred embodiment illustrating the trigger member and a hook body.
Figure 4:
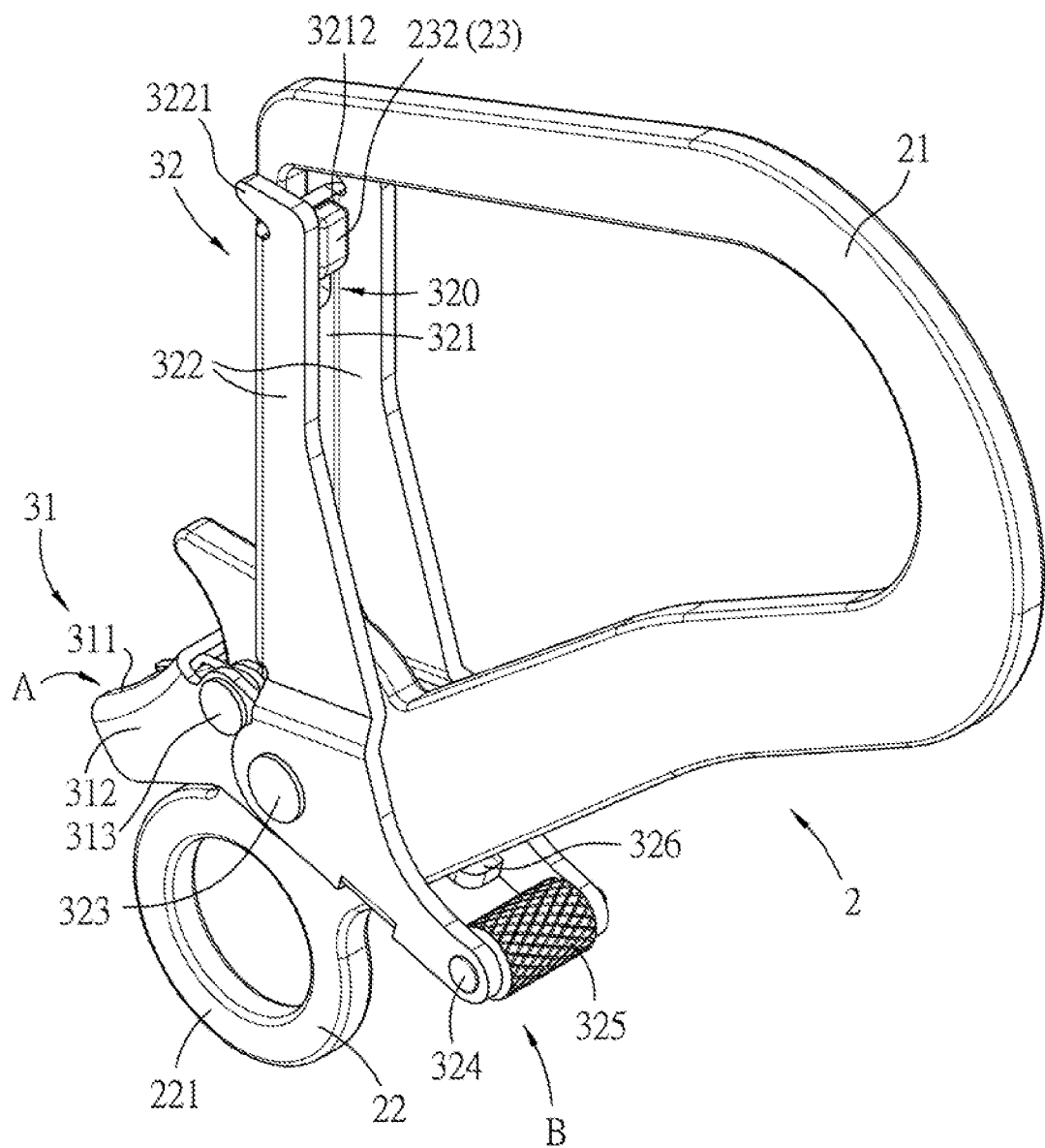
FIG. 4 is a perspective view of the first preferred embodiment.

Before the present invention is described in greater detail, it should be noted that like elements are denoted by the same reference numerals throughout the disclosure.

As shown in FIGS. 1 to 4, a first preferred embodiment of a safety hook according to the present invention includes a hook body 2 and a trigger unit 3.

The hook body 2 has a base segment 22, a hook segment 21 that extends curvedly from the base segment 22, and an auxiliary hook segment 23 that extends from a distal end of the hook segment 21. The auxiliary hook segment 23 and the base segment 22 cooperatively define an opening 20 therebetween.

The base segment 22 has a connecting portion that is connected to the hook segment 21 and that is formed with an engaging groove 222 proximate to the opening 20, a central portion that is formed with a limiting groove 223, and an end portion 221 that is opposite to the hook segment 21 and that has a ring structure for being tied with a rope (not shown). The engaging groove 222 is defined by an abutment surface 2221 of the base segment 22 (see FIG. 3). The limiting groove 223 has a first end 2231 that is distal from the engaging groove 222, and a second end 2232 that is opposite to the first end 2231 and that is proximate to the engaging groove 222.

The auxiliary hook segment 23 has a distal end portion 232 that extends away from the base segment 22, and an intermediate portion 231 that interconnects the distal end of the hook segment 21 and the distal end portion 232. In this embodiment, the intermediate portion 231 is L-shaped and cooperates with the distal end portion 232 to form a U-shaped structure and to define a retaining space 233 therebetween.

The trigger unit 3 includes a keeper member 31, a first rod member 313, a trigger member 32, a second rod member 323 and a first resilient member 33.

The first rod member 313 interconnects pivotally the keeper member 31 and the base segment 22 of the hook body 2.

The keeper member 31 has a pair of spaced-apart lever walls 312 and a connecting wall 311.

The lever walls 312 are respectively disposed at two opposite sides of the hook body 2. Each of the lever walls 312 has a central portion for extension of the first rod member 313 therethrough, a perforated first distal portion corresponding in position to the limiting groove 223, and a second distal portion that is opposite to the limiting groove 223.

The connecting wall 311 interconnects the second distal portions of the lever walls 312. The connecting wall 311 and the second distal portions of the lever walls 312 cooperatively serve as an operating section (A) of the keeper member 31 (see FIG. 4). The keeper member 31 is operable to pivot relative to the base segment 22 between a released position (see FIG. 5) where the operating section (A) is distal from the base segment 22, and a pressed position (see FIG. 7) where the operating section (A) is proximate to the base segment 22.

The trigger member 32 has a pair of spaced-apart lever walls 322, a base wall 321, a connecting pin 324 and a roller member 325.

The lever walls 322 are respectively disposed at the two opposite sides of the hook body 2. Each of the lever walls 322 has a central portion that corresponds in position to the limiting groove 223, a first distal portion that is proximate to the auxiliary hook segment 23, and a second distal portion that is distal from the auxiliary hook segment 23.

The base wall 321 interconnects the first distal portions of the lever walls 312. A distal portion of the base wall 321 distal from the central portions of the lever walls 322 has a hoop structure 320. A distal portion of the hoop structure 320 serves as an engaging section 3212. A proximal portion of the base wall 321 proximate to the central portions of the lever walls 322 is formed with a positioning groove 3213, and has an engaging surface 3214 that faces toward the hook segment 21 of the hook body 2.

The connecting pin 324 extends through and interconnects the second distal portions of the lever walls 322.

The roller member 325 is mounted on the connecting pin 324. The connecting pin 324, the roller member 325 and the second distal portions of the lever walls 322 cooperatively serve as an operating section (B) of the trigger member 32 (see FIG. 4).

The second rod member 323 extends through the limiting groove 223, the central portions of the lever walls 322 of the trigger member 32 and the first distal portions of the lever walls 312 of the keeper member 31 to interconnect pivotally the keeper member 31 and the trigger member 32. The second rod member 323 is slidable within the limiting groove 223 between the first and second ends 2231, 2232 so as to limit a range of pivot movement of the keeper member 31 relative to the base segment 22.

The trigger member 32 further has a pair of positioning walls 326 and a pair of guide walls 3221.

The positioning walls 326 extend respectively from the second distal portions of the lever walls 322 toward each other, and clamp slidably the base segment 22 of the hook body 2 therebetween for positioning the trigger member 32 relative to the base segment 22 of the hook body 2 (i.e., for preventing wobbling of the trigger member 32 during the pivot movement of the trigger member 32 relative to the base segment 22 of the hook body 2).

The guide walls 3221 extend respectively from the first distal portions of the lever walls 322, and are respectively disposed at two opposite sides of the auxiliary hook segment 23 for facilitating engagement and disengagement of the auxiliary hook segment 23 and the trigger member 32.

The first resilient member 33 is configured as a torsion spring, and has a central portion 332 wound on the first and second rod members 313, 323, a first end portion 331 abutting against the keeper member 31 for biasing the keeper member 31 toward the released position, and a second end portion 334 opposite to the first end portion 331 and abutting against the trigger member 32 for biasing the trigger member 32 away from the hook segment 21 of the hook body 2.

Figure 5:
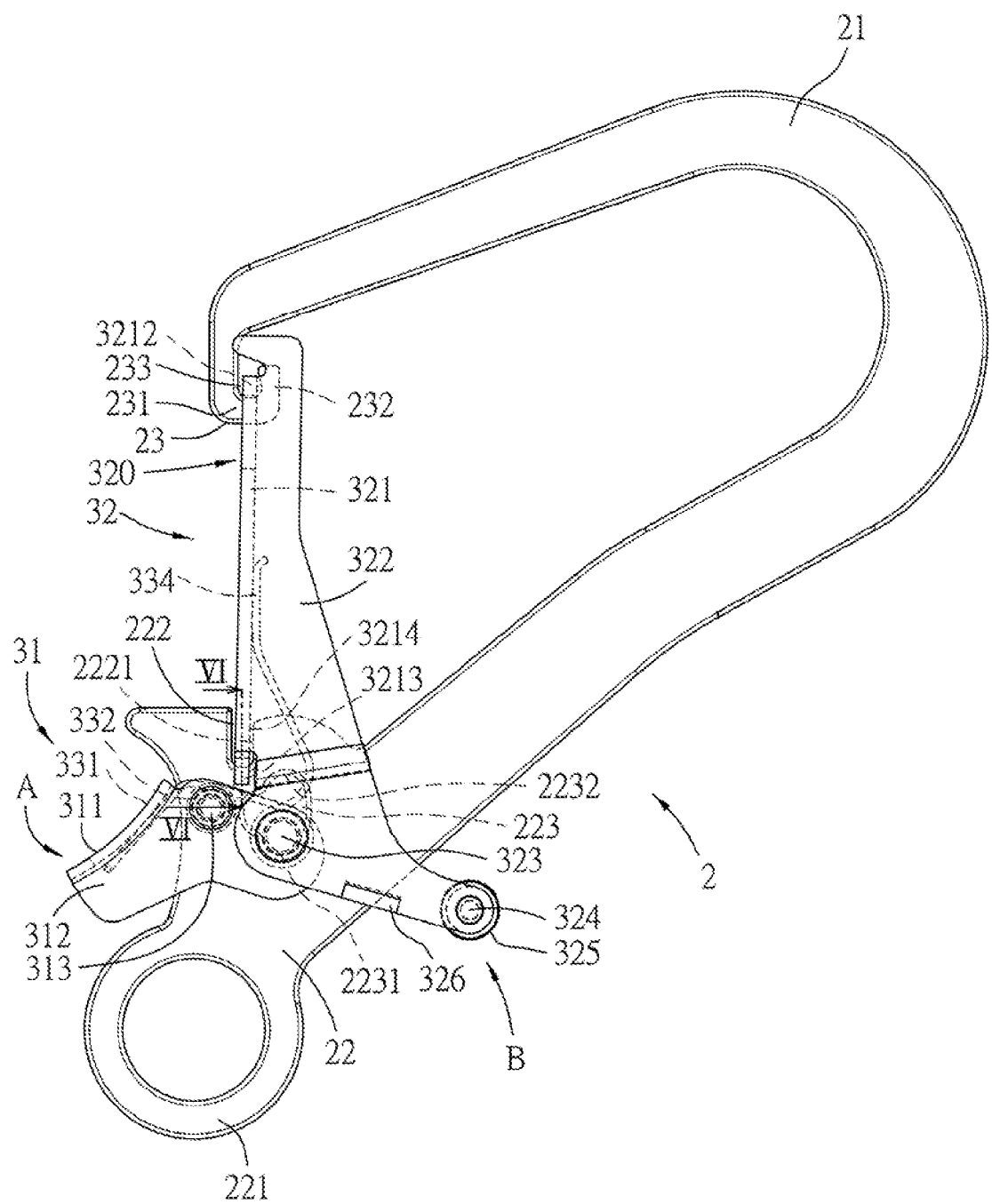
FIG. 5 is a side view of the first preferred embodiment illustrating a keeper member at a released position.
Figure 6:
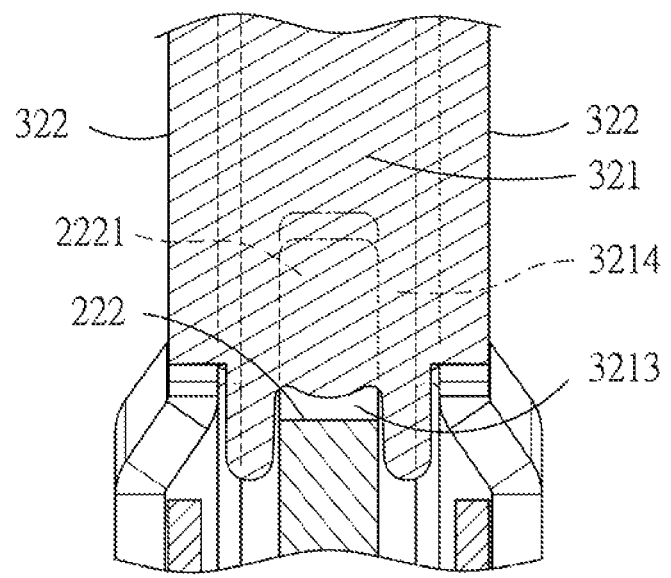
FIG. 6 is a fragmentary sectional view of the first preferred embodiment taken along line VI-VI in FIG. 5, illustrating the trigger member engaging the hook body.

Referring to FIGS. 5 and 6, when the keep member 31 is at the released position, the second rod member 323 is at the first end 2231 of the limiting groove 223 while the trigger member 32 blocks the opening 20 of the hook body 2 and engages the base segment 22 and the auxiliary hook segment 23 of the hook body 2.

In detail, the proximal portion of the base wall 321 of the trigger member 32 engages the engaging groove 222, the engaging surface 3214 abuts against the abutment surface 2221, and the intermediate portion 231 and the distal end portion 232 of the auxiliary hook segment 23 engage the engaging section 3212 of the base wall 321 of the trigger member 32 with the intermediate portion 231 extending through the hoop structure 320 of the base wall 321 and with the engaging section 3212 being retained in the retaining space 233, such that the trigger member 32 is unable to pivot relative to the keeper member 31 to unblock the opening 20. At this time, a portion of the base segment 22 engages the positioning groove 3213 such that the trigger member 32 is prevented from wobbling relative to the hook body 2.

Figure 7:
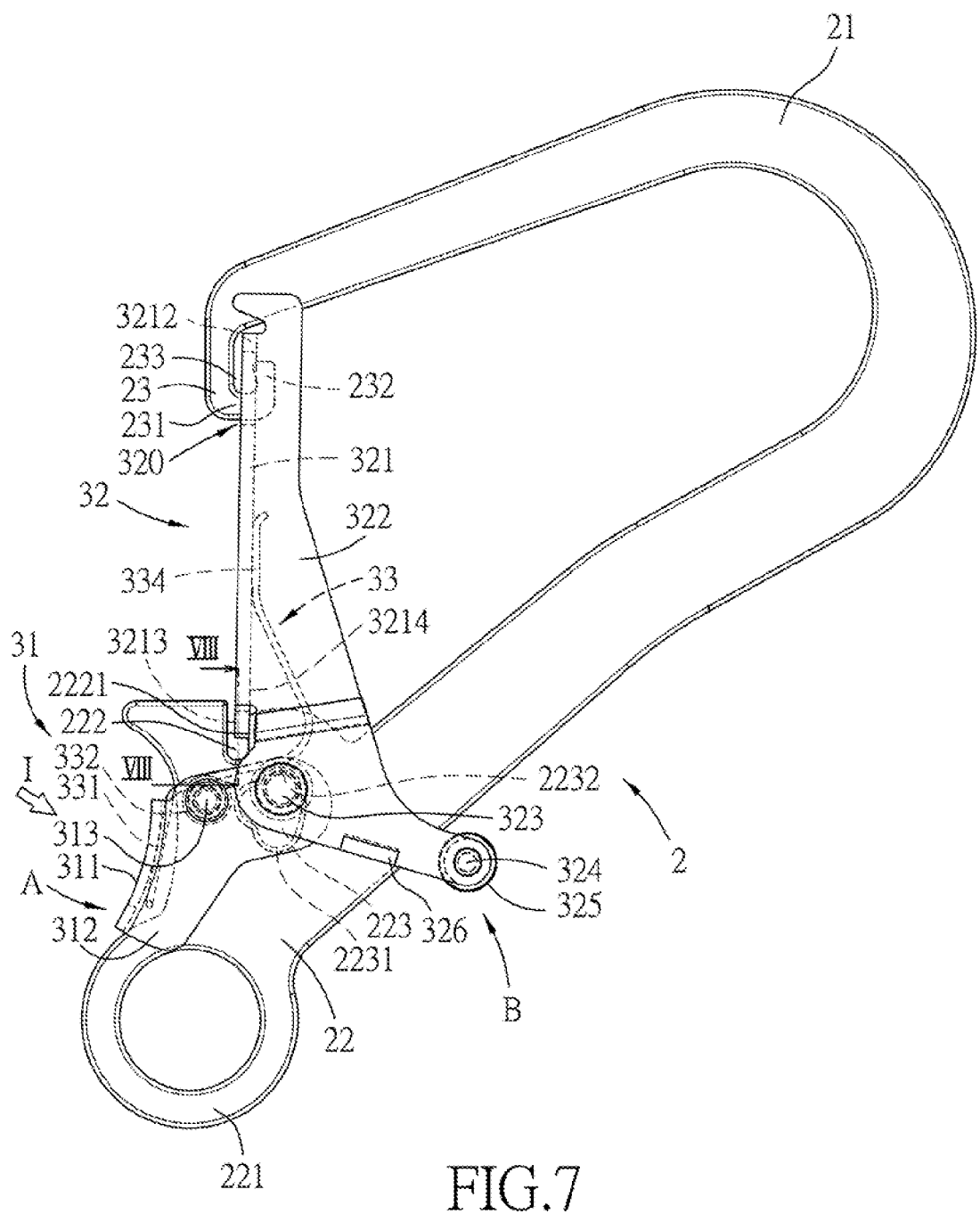
FIG. 7 is another side view of the first preferred embodiment illustrating the keeper member at a pressed position.
Figure 8:
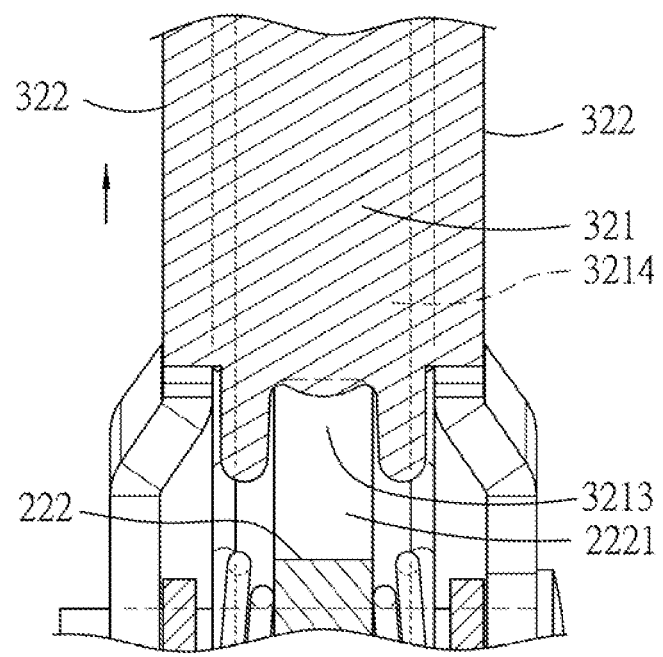
FIG. 8 is another fragmentary sectional view of the first preferred embodiment taken along line VIII-VIII in FIG. 7, illustrating the trigger member being disengaged from the hook body.

Referring to FIGS. 7 and 8, when the keeper member 31 pivots to the pressed position, the second rod member 323 is moved to the second end 2232 of the limiting groove 223 via pivot movement of the keeper member 31 to disengage the trigger member 32 from the base segment 22 and the auxiliary hook segment 23 of the hook body 2.

Figure 9:
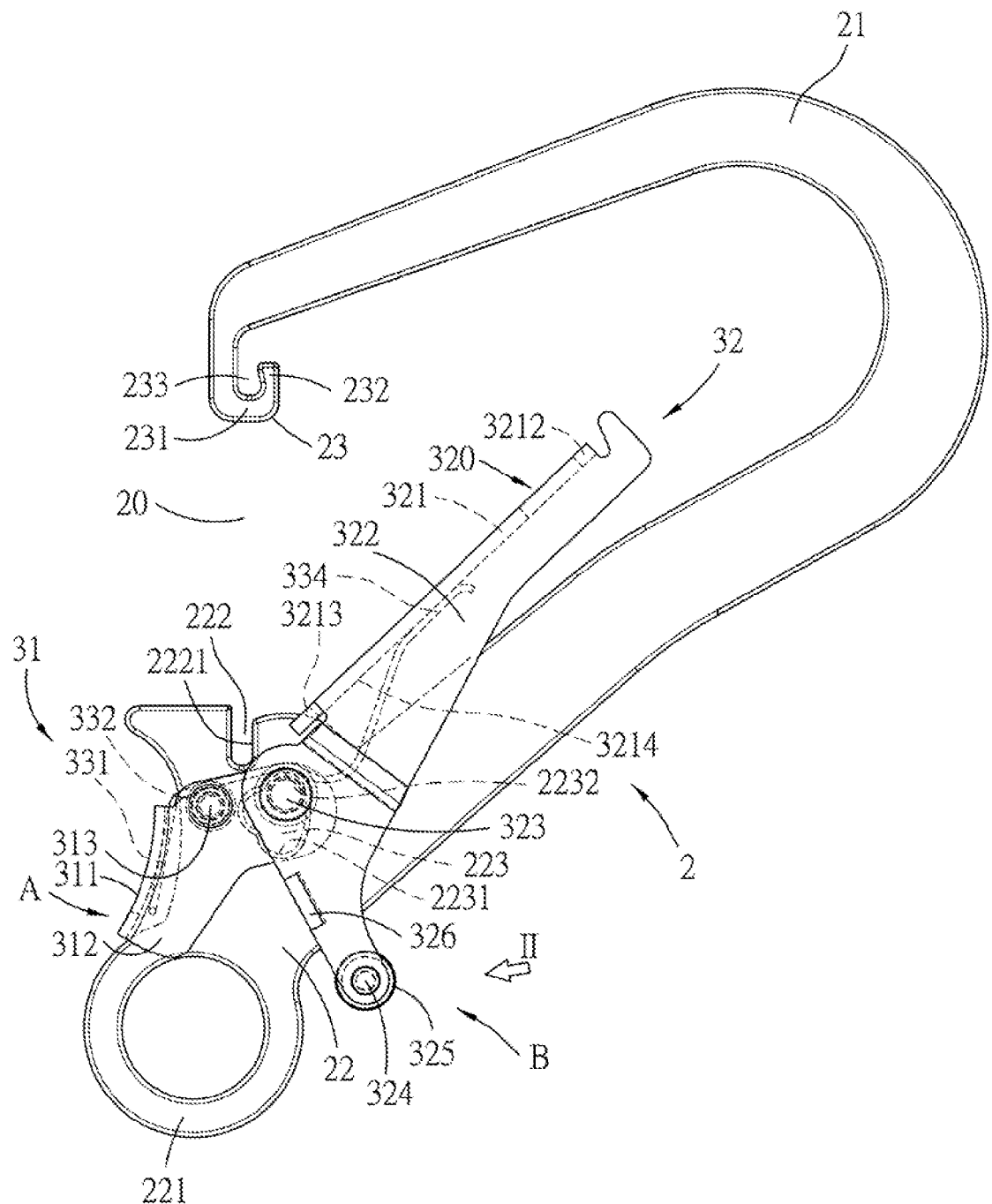
FIG. 9 is still another side view of the first preferred embodiment illustrating the keeper member at the pressed position and the trigger member unblocking an opening of the hook body.

In detail, the proximal portion of the base wall 321 of the trigger member 32 is disengaged from the engaging groove 222, the engaging surface 3214 is separated from the abutment surface 2221, and the intermediate portion 231 and the distal end portion 232 of the auxiliary hook segment 23 are disengaged from the engaging section 3212 of the base wall 321 of the trigger member 32 with the engaging section 3212 escaping from the retaining space 233, such that the trigger member 32 is able to pivot relative to the keeper member 31 to unblock the opening 20 of the hook body 2 (see FIG. 9).

In use, a user needs to sequentially press the operating section (A) of the keeper member 31 against the resilient force of the first resilient member 33 to drive the keeper member 31 to pivot from the released position to the pressed position so as to disengage the trigger member 32 from the base segment 22 and the auxiliary hook segment 23 of the hook body 2, and press the operating section (B) of the trigger member 32 in a direction opposite to that of the keeper member 31 to drive the trigger member 32 while holding the keeper member 31 at the pressed position to pivot the trigger member 32 toward the hook segment 21 of the hook body 2 so as to unblock the opening 20. Therefore, the opening 20 of the hook body 2 would not be accidentally unblocked when the keeper member 31 is at the released position. As a result, the safety hook of this invention is safer to use than the conventional safety hook when applied to aerial work.

Figure 10:
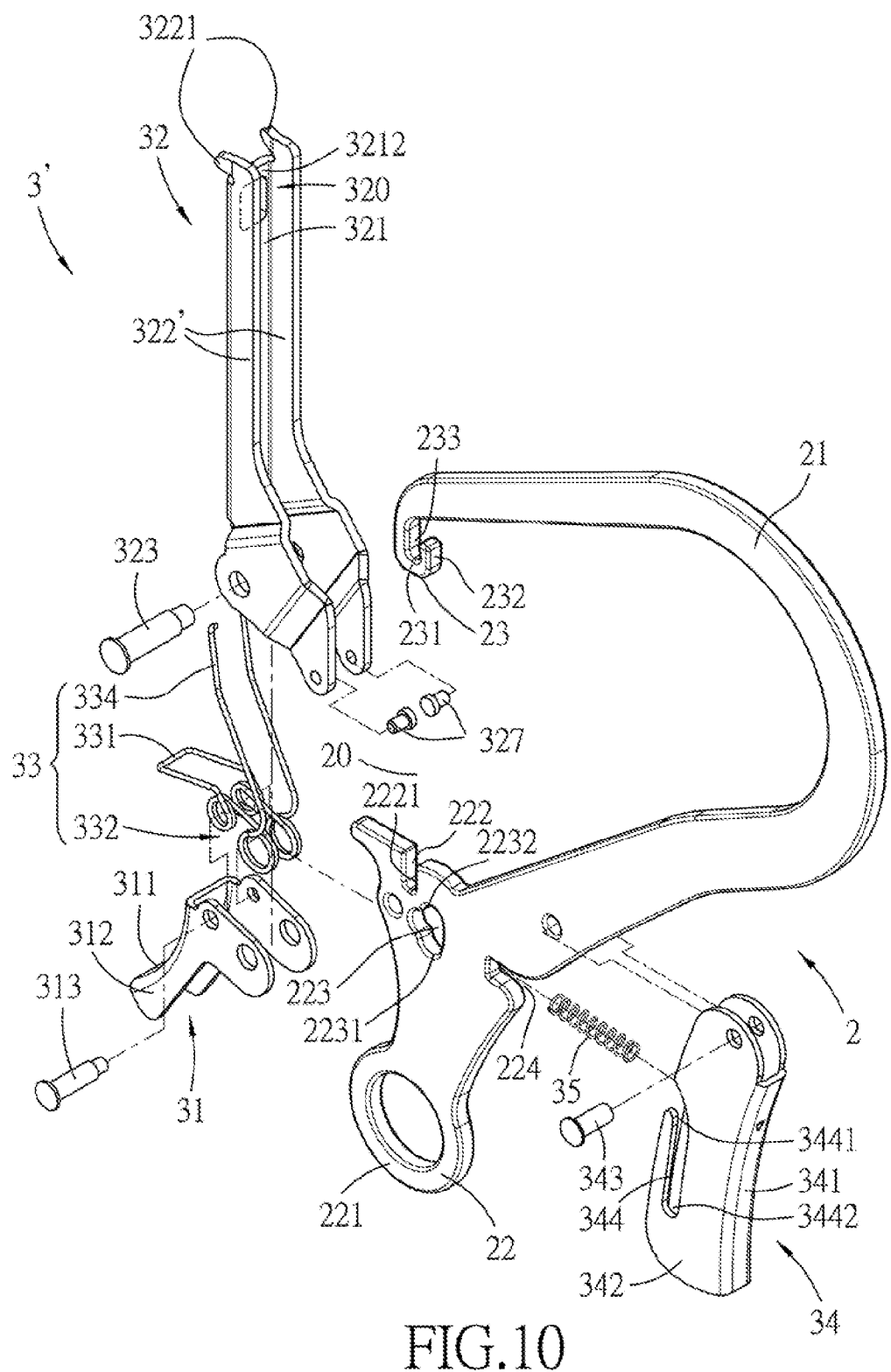
FIG. 10 is an exploded perspective view of a second preferred embodiment of the safety hook according to the invention.
Figure 11:
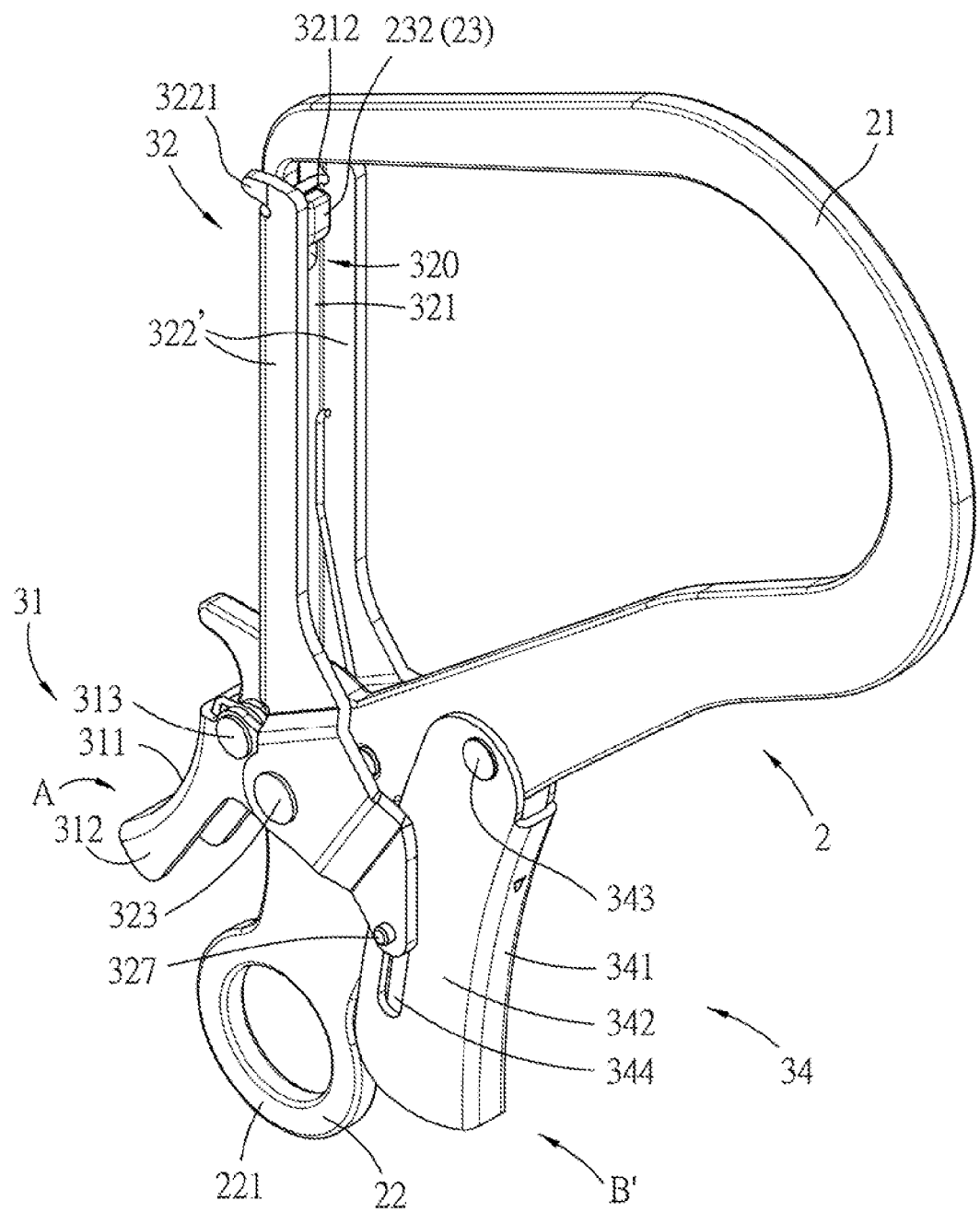
FIG. 11 is a perspective view of the second preferred embodiment.

Referring to FIGS. 10 and 11, a second preferred embodiment of the safety hook according to this invention is similar to the first preferred embodiment. The difference between the first and second preferred embodiments resides in that the trigger unit 3' of the second preferred embodiment further includes an operating member 34, a third rod member 343 that interconnects pivotally the operating member 34 and the base segment 22 of the hook body 2, and a second resilient member 35 that is connected between the operating member 34 and the base segment 22. Moreover, the connecting pin 324, the roller member 325 and the positioning walls 326 of the trigger member 32 depicted in the previous embodiment are omitted in this embodiment, and a distance between the lever walls 322' of the trigger member 32 of the second preferred embodiment is smaller than that of the first preferred embodiment.

The operating member 34 is connected to the base segment 22, is disposed opposite to the keeper member 31, and has a pair of spaced-apart side walls 342 and a carved connecting wall 341. The side walls 342 are respectively disposed at the two opposite sides of the hook body 2. Each of the side walls 342 has a first end portion for extension of the third rod member 343 therethrough, a side portion that is proximate to the base segment 22 and that is formed with a sliding groove 344, and a second end portion opposite to the first end portion. The curved connecting wall 341 interconnects the second end portions of the side walls 342, and is curved away from the base segment 22 in a direction from the first end portions of the side walls 342 toward the second end portions of the side walls 342. The curved connecting wall 341 and the second end portions of the side walls 342 cooperatively serve as an operating section (B') of the operating member 34 for being pressed toward the base segment 22 (see FIG. 12).

The trigger member 32 further has a pair of sliding pins 327 that are connected respectively to the second distal portions of the lever walls 322', and that engage respectively and slidably the sliding grooves 344 of the side walls 342 of the operating member 34, such that pivot movement of the operating member 34 drives pivot movement of the trigger member 32 via sliding engagement between the sliding pins 327 and the sliding grooves 344 when the keeper member 31 is at the pressed position.

The sliding groove 344 of each of the side walls 342 of the operating member 34 has a first end 3441 that is proximate to the third rod member 343, and a second end 3442 that is opposite to the first end and that is distal from the third rod member 343. Each of the sliding pins 327 is at the first end of the respective one of the sliding grooves 344 when the operating member 34 is released, and is moved to the second end 3442 of the respective one of the sliding grooves 344 when the operating member 34 is pressed, such that the trigger member 32 is able to pivot relative to the keeper member 31 to unblock the opening 20 of the hook body 2.

The base segment 22 of the second preferred embodiment is further formed with an installing groove 224. The second resilient member 35 is partially retained in the installing groove 224, and is connected between the base segment 22 and the connecting wall 341 of the operating member 34 for biasing the operating member 34 away from the base segment 22.

Figure 12:
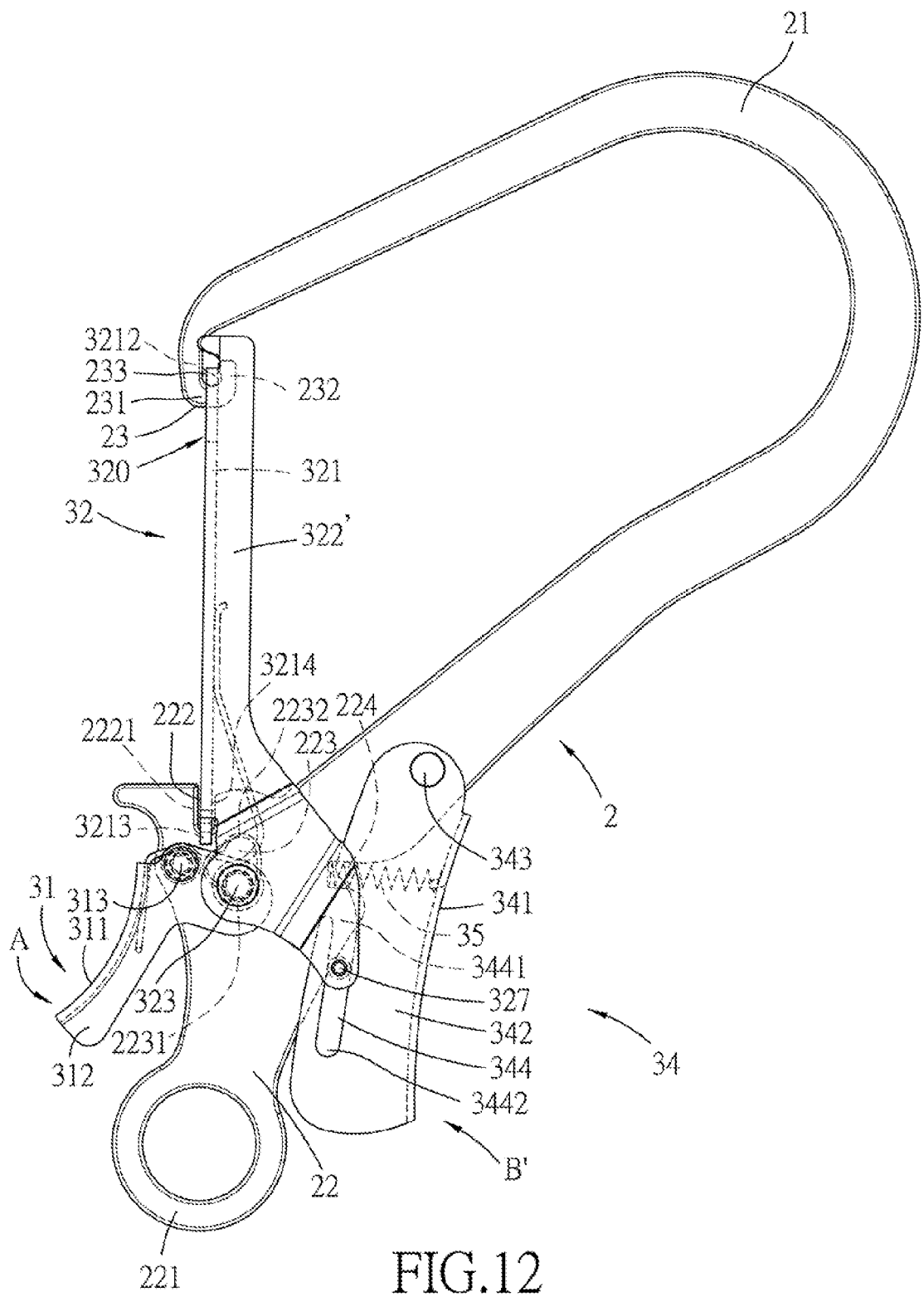
FIG. 12 is a side view of the second preferred embodiment illustrating the beeper member at the released position.
Figure 13:
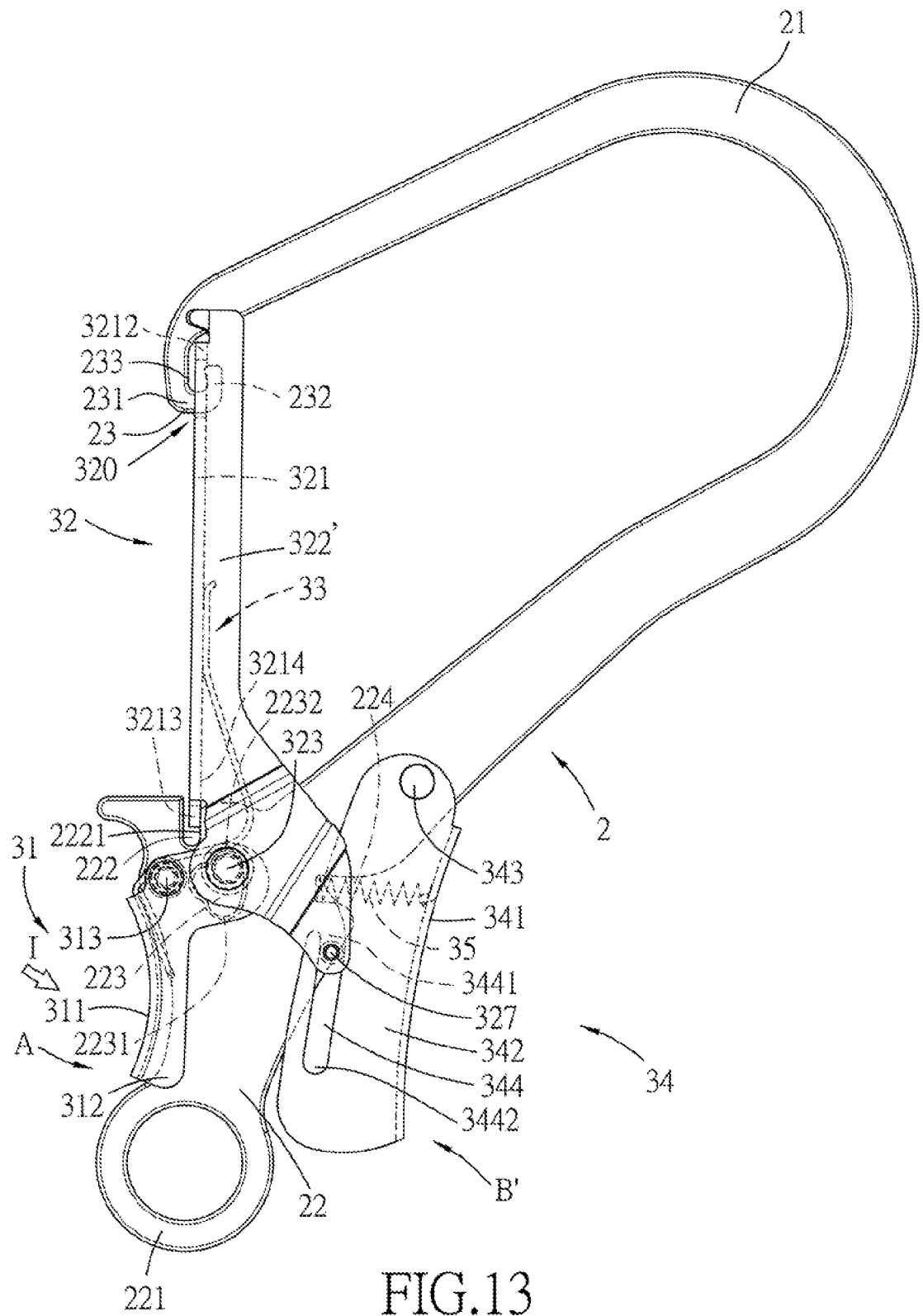
FIG. 13 is another side view of the second preferred embodiment illustrating the keeper member at the pressed position.
Figure 14:
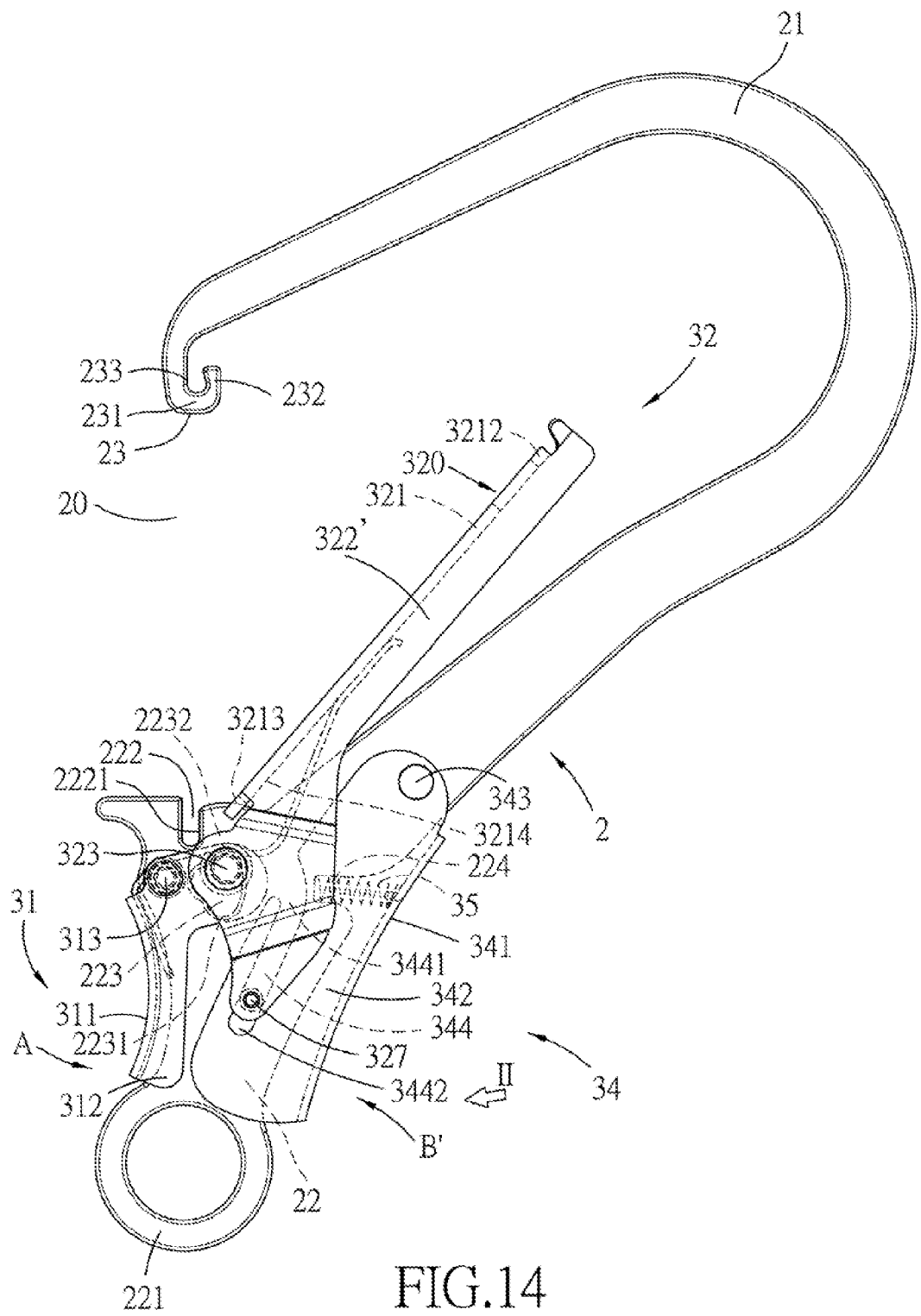
FIG. 14 is still another side view of the second preferred embodiment illustrating the keeper member at the pressed position, and an operating member being pressed to drive the trigger member to unblock the opening of the hook body.

Referring to FIGS. 12 to 14, similar to the first preferred embodiment, the trigger member 32 engages the base segment 22 and the auxiliary hook segment 23 of the hook body 2 and is unable to pivot relative to the keeper member 31 so as to block the opening 20 of the hook body 2 when the keeper member 31 is at the released position (see FIG. 12). When the keeper member 31 is at the pressed position (see FIGS. 13 and 14), the trigger member 32 is disengaged from the base segment 22 and the auxiliary book segment 23 of the hook body 2 and is able to pivot relative to the keeper member 31 to unblock the opening 20 of the hook body 2.

In use, a user needs to sequentially press the operating section (A) of the keeper member 31 against the resilient force of the first resilient member 33 to drive the keeper member 31 to pivot from the released position to the pressed position so as to disengage the trigger member 32 from the base segment 22 and the auxiliary hook segment 23 of the hook body 2, and press the operating section (B') of the operating member 34 in a direction opposite to that of the keeper member 31 against the resilient force of the second resilient member 35 while holding the keeper member 31 at the pressed position to drive the trigger member 32 to pivot toward the hook segment 21 of the hook body 2 so as to unblock the opening 20. Therefore, the opening 20 of the hook body 2 would not foe accidentally unblocked when the keeper member 31 is at the released position.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A safety hook, comprising:
   a hook body including:
      a base segment,
      a hook segment that extends curvedly from said base segment, and
      an auxiliary hook segment that extends from a distal end of said hook segment, said auxiliary hook segment and said base segment cooperatively defining an opening therebetween; and
   a trigger unit including:
      a keeper member that is connected pivotally to said base segment of said hook body, and
      a trigger member that is connected pivotally to said keeper member, said keeper member being operable to pivot relative to said base segment between a released position and a pressed position, so as to drive said trigger member to move relative to said hook body, said trigger member engaging said base segment and said auxiliary hook segment of said hook body and being unable to pivot relative to said keeper member so as to block said opening of said hook body when said keeper member is at said released position, said trigger member being disengaged from said base segment and said auxiliary hook segment of said hook body and being able to pivot relative said keeper member to unblock said opening of said hook body when said keeper member is at said pressed position;
      a first rod member that interconnects pivotally said keeper member and said base segment, and
      a second rod member that interconnects pivotally said keeper member and said trigger member;

wherein said trigger member has a base wall that has a portion proximate to said second rod member and having an engaging surface that faces toward said hook segment; and wherein said base segment of said hook body has an abutment surface, said engaging surface abutting against said abutment surface when said keeper member is at said released position, said engaging surface being separated from said abutment surface when said keeper member is at said pressed position.

2. The safety hook as claimed in claim 1, wherein:

said base segment of said hook body is formed with a limiting groove that has opposite first and second ends;

wherein said
second rod member extends through said limiting groove, and that is slidable within said limiting groove between said first and second ends so as to limit a range of pivot movement of said keeper member relative to said base segment, said second rod member being at said first end of said limiting groove when said keeper member is at said released position, and being moved to said second end of said limiting groove via pivot movement of said keeper member from said released position to said pressed position so as to disengage said trigger member from said base segment and said auxiliary hook segment of said hook body;

said keeper member further has an operating section that is away from said first rod member for being pressed to drive said keeper member to pivot from said released position to said pressed position; and said trigger member further has an operating section that is away from said second rod member for being pressed to drive said trigger member to pivot toward said hook segment of said hook body so as to unblock said opening when said keeper member is at said pressed position.

3. The safety hook as claimed in claim 2, wherein:

said auxiliary hook segment of said hook body has a distal end portion that extends away from said base segment of said hook body; and said trigger member further has an engaging section that is opposite to said operating section thereof, said engaging section engaging said distal end portion of said auxiliary hook segment when said keeper member is at said released position, said engaging section of said trigger member being disengaged from said distal end portion of said auxiliary hook segment when said keeper member is at said pressed position.

4. The safety hook as claimed in claim 3, wherein:

said auxiliary hook segment of said hook body further has an intermediate portion that interconnects said distal end portion thereof and said hook segment of said hook body; and a distal portion of said trigger member has a hoop structure, a portion of said hoop structure serving as said engaging section, said intermediate portion extending through said hoop structure to engage said engaging section, and to allow engagement between said engaging section and said distal end portion of said auxiliary hook segment when said keeper member is at said released position, said engaging section of said trigger member being disengaged from said intermediate portion and said distal end portion of said auxiliary hook segment when said keeper member is at said pressed position.

5. The safety hook as claimed in claim 1, wherein:

said base segment of said hook body is formed with a limiting groove that has opposite first and second ends;

said
second rod member extends through said limiting groove, and that is slidable within said limiting groove between said first and second ends so as to limit a range of pivot movement of said keeper member relative to said base segment, said second rod member being at said first end of said limiting groove when said keeper member is at said released position, and being moved to said second end of said limiting groove via pivot movement of said keeper member from said released position to said pressed position so as to disengage said trigger member from said base segment and said auxiliary hook segment of said hook body, an operating member that has a pair of spaced-apart side walls respectively disposed at two opposite sides of said hook body, each of said side walls having an end portion that is connected pivotally to said base segment, and being formed with a sliding groove, and a third rod member that extends through said base segment and said end portions of said side walls of said operating member to interconnect pivotally said base segment and said operating member; and said trigger member further has
a pair of spaced-apart lever walls that are respectively disposed at two opposite sides of said hook body, each of said lever walls having a central portion for extension of said second rod member therethrough, a first distal portion that is proximate to said auxiliary hook segment, and a second distal portion that is distal from said auxiliary hook segment, a base wall that interconnects said first distal portions of said lever walls, and a pair of sliding pins that are connected respectively to said second distal portions of said lever walls of said trigger member, and that engage respectively and slidably said sliding grooves of said side walls of said operating member, said operating member being pivotable relative to said base segment to drive pivot movement of said trigger member via sliding engagement between said sliding pins and said sliding grooves when said keeper member is at said pressed position.

6. The safety hook as claimed in claim 5, wherein said sliding groove of each of said side walls of said operating member has a first end that is proximate to said third rod member, and a second end that is opposite to said first end and that is distal from said third rod member, each of said sliding pins being at said first end of a respective one of said sliding grooves when said operating member is released, each of said sliding pins being at said second end of a respective one of said sliding grooves when said operating member is pressed.

7. The safety hook as claimed in claim 5, wherein said operating member further has a curved connecting wall that interconnects said side walls thereof for being pressed.

8. The safety hook as claimed in claim 7, wherein said trigger unit further includes a resilient member that is connected between said base segment of said hook body and said connecting wall of said operating member for biasing said operating member away from said base segment of said hook body.

9. The safety hook as claimed in claim 1, wherein said trigger member has:
a pair of spaced-apart lever walls that are respectively disposed at two opposite sides of said hook body, each of said lever walls having a central portion that is connected pivotally to said base segment of said hook body, a first distal portion that is proximate to said auxiliary hook segment, and a second distal portion that is distal from said auxiliary hook segment;
a base wall that interconnects said first distal portions of said lever walls; and
a pair of guide walls that extend respectively from said first distal portions of said lever walls.

10. A safety hook comprising:
a hook body having
a base segment,
a hook segment that extends curvedly from said base segment, and
an auxiliary hook segment that extends from a distal end of said hook segment, said auxiliary hook segment and said base segment cooperatively defining an opening therebetween; and
a trigger unit including
a keeper member that is connected pivotally to said base segment of said hook body, and
a trigger member that is connected pivotally to said keeper member, said keeper member being operable to pivot relative to said base segment between a released position and a pressed position, so as to drive said trigger member to move relative to said hook body, said trigger member engaging said base segment and said auxiliary hook segment of said hook body and being unable to pivot relative to said keeper member so as to block said opening of said hook body when said keeper member is at said released position, said trigger member being disengaged from said base segment and said auxiliary hook segment of said hook body and being able to pivot relative said keeper member to unblock said opening of said hook body when said keeper member is at said pressed position;
wherein said base segment of said hook body is formed with a limiting groove that has opposite first and second ends;
wherein said trigger unit further includes
a first rod member that interconnects pivotally said keeper member and said base segment, and
a second rod member that interconnects pivotally said keeper member and said trigger member, that extends through said limiting groove, and that is slidable within said limiting groove between said first and second ends so as to limit a range of pivot movement of said keeper member relative to said base segment, said second rod member being at said first end of said limiting groove when said keeper member is at said released position, and being moved to said second end of said limiting groove via pivot movement of said keeper member from said released position to said pressed position so as to disengage said trigger member from said base segment and said auxiliary hook segment of said hook body;
wherein said keeper member has an operating section that is away from said first rod member for being pressed to drive said keeper member to pivot from said released position to said pressed position;

wherein said trigger member has an operating section that is away from said second rod member for being pressed to drive said trigger member to pivot toward said hook segment of said hook body so as to unblock said opening when said keeper member is at said pressed position; and
wherein said trigger member further includes:
a pair of spaced-apart lever walls that are respectively disposed at two opposite sides of said hook body, each of said lever walls having a central portion for extension of said second rod member therethrough, a first distal portion that is proximate to said auxiliary hook segment, and a second distal portion that is distal from said auxiliary hook segment;
a base wall that interconnects said first distal portions of said lever walls;
a connecting pin that extends through and interconnects said second distal portions of said lever walls; and
a roller member that is mounted on said connecting pin, wherein said connecting pin, said roller member and said second distal portions of said lever walls cooperatively serve as said operating section of said trigger member.

11. A safety hook, comprising:
a hook body having
a base segment,
a hook segment that extends curvedly from said base segment, and
an auxiliary hook segment that extends from a distal end of said hook segment, said auxiliary hook segment and said base segment cooperatively defining an opening therebetween; and
a trigger unit including
a keeper member that is connected pivotally to said base segment of said hook body, and
a trigger member that is connected pivotally to said keeper member, said keeper member being operable to pivot relative to said base segment between a released position and a pressed position, so as to drive said trigger member to move relative to said hook body, said trigger member engaging said base segment and said auxiliary hook segment of said hook body and being unable to pivot relative to said keeper member so as to block said opening of said hook body when said keeper member is at said released position, said trigger member being disengaged from said base segment and said auxiliary hook segment of said hook body and being able to pivot relative said keeper member to unblock said opening of said hook body when said keeper member is at said pressed position;
wherein said base segment of said hook body is formed with a limiting groove that has opposite first and second ends;
wherein said trigger unit further includes
a first rod member that interconnects pivotally said keeper member and said base segment, and
a second rod member that interconnects pivotally said keeper member and said trigger member, that extends through said limiting groove, and that is slidable within said limiting groove between said first and second ends so as to limit a range of pivot movement of said keeper member relative to said base segment, said second rod member being at said first end of said limiting groove when said keeper member is at said released position, and being moved to said second end of said limiting groove via pivot movement of said keeper member from said released position to said pressed position so as to disengage said trigger member from said base segment and said auxiliary hook segment of said hook body;

wherein said keeper member has an operating section that is away from said first rod member for being pressed to drive said keeper member to pivot from said released position to said pressed position;

wherein said trigger member has an operating section that is away from said second rod member for being pressed to drive said trigger member to pivot toward said hook segment of said hook body so as to unblock said opening when said keeper member is at said pressed position; and wherein said trigger member further has:
- a pair of spaced-apart lever walls that are respectively disposed at two opposite sides of said hook body, each of said lever walls having a central portion for extension of said second rod member therethrough, a first distal portion that is proximate to said auxiliary hook segment, and a second distal portion that is distal from said auxiliary hook segment;
- a base wall that interconnects said first distal portions of said lever walls; and
- a pair of positioning walls that extend respectively from said second distal portions of said lever walls toward each other, and that clamp slidably said base segment of said hook body for positioning said trigger member relative to said base segment of said hook body.

12. A safety hook, comprising:
a hook body having
  a base segment,
  a hook segment that extends curvedly from said base segment, and
  an auxiliary hook segment that extends from a distal end of said hook segment, said auxiliary hook segment and said base segment cooperatively defining an opening therebetween; and
a trigger unit including
  a keeper member that is connected pivotally to said base segment of said hook body, and
  a trigger member that is connected pivotally to said keeper member, said keeper member being operable to pivot relative to said base segment between a released position and a pressed position, so as to drive said trigger member to move relative to said hook body, said trigger member engaging said base segment and said auxiliary hook segment of said hook body and being unable to pivot relative to said keeper member so as to block said opening of said hook body when said keeper member is at said released position, said trigger member being disengaged from said base segment and said auxiliary hook segment of said hook body and being able to pivot relative said keeper member to unblock said opening of said hook body when said keeper member is at said pressed position;

wherein said base segment of said hook body is formed with a limiting groove that has opposite first and second ends;

wherein said trigger unit further includes
  a first rod member that interconnects pivotally said keeper member and said base segment, and
  a second rod member that interconnects pivotally said keeper member and said trigger member, that extends through said limiting groove, and that is slidable within said limiting groove between said first and second ends so as to limit a range of pivot movement of said keeper member relative to said base segment, said second rod member being at said first end of said limiting groove when said keeper member is at said released position, and being moved to said second end of said limiting groove via pivot movement of said keeper member from said released position to said pressed position so as to disengage said trigger member from said base segment and said auxiliary hook segment of said hook body;

wherein said keeper member has an operating section that is away from said first rod member for being pressed to drive said keeper member to pivot from said released position to said pressed position;

wherein said trigger member has an operating section that is away from said second rod member for being pressed to drive said trigger member to pivot toward said hook segment of said hook body so as to unblock said opening when said keeper member is at said pressed position; and wherein said trigger unit further includes a resilient member that is connected to said base segment of said hook body for biasing said keeper member toward said released position, and for biasing said trigger member away from said hook segment of said hook body.

13. The safety hook as claimed in claim 12, wherein said resilient member has a central portion wound on said first and second rod members, a first end portion abutting against said keeper member for biasing said keeper member toward said released position, and a second end portion opposite to said first end portion and abutting against said trigger member for biasing said trigger member away from said hook segment of said hook body.

14. A safety hook comprising:
a hook body having
  a base segment,
  a hook segment that extends curvedly from said base segment, and
  an auxiliary hook segment that extends from a distal end of said hook segment, said auxiliary hook segment and said base segment cooperatively defining an opening therebetween; and
a trigger unit including
  a keeper member that is connected pivotally to said base segment of said hook body, and
  a trigger member that is connected pivotally to said keeper member, said keeper member being operable to pivot relative to said base segment between a released position and a pressed position, so as to drive said trigger member to move relative to said hook body, said trigger member engaging said base segment and said auxiliary hook segment of said hook body and being unable to pivot relative to said keeper member so as to block said opening of said hook body when said keeper member is at said released position, said trigger member being disengaged from said base segment and said auxiliary hook segment of said hook body and being able to pivot relative said keeper member to unblock said opening of said hook body when said keeper member is at said pressed position;

wherein said base segment of said hook body is formed with a limiting groove that has opposite first and second ends;

wherein said trigger unit further includes
- a first rod member that interconnects pivotally said keeper member and said base segment, and
- a second rod member that interconnects pivotally said keeper member and said trigger member, that extends through said limiting groove, and that is slidable within said limiting groove between said first and second ends so as to limit a range of pivot movement of said keeper member relative to said base segment, said second rod member being at said first end of said limiting groove when said keeper member is at said released position, and being moved to said second end of said limiting groove via pivot movement of said keeper member from said released position to said pressed position so as to disengage said trigger member from said base segment and said auxiliary hook segment of said hook body;

wherein said keeper member has an operating section that is away from said first rod member for being pressed to drive said keeper member to pivot from said released position to said pressed position;

wherein said trigger member has an operating section that is away from said second rod member for being pressed to drive said trigger member to pivot toward said hook segment of said hook body so as to unblock said opening when said keeper member is at said pressed position; and wherein said keeper member further has:
- a pair of spaced-apart lever walls that are respectively disposed at two opposite sides of said hook body, each of said lever walls having a central portion for extension of said first rod member therethrough, a first distal portion for extension of said second rod member therethrough, and a second distal portion that is opposite to said second rod member and that is proximate to said base segment of said hook body; and
- a connecting wall that interconnects said second distal portions of said lever walls, wherein said connecting wall and said second distal portions of said lever walls cooperatively serve as said operating section of said keeper member.

* * * * *